(12) United States Patent
Zhang

(10) Patent No.: US 7,613,454 B2
(45) Date of Patent: Nov. 3, 2009

(54) NETWORK AND METHOD OF REALIZING LOCAL ROAMING FOR SUBSCRIBERS

(75) Inventor: Shaobo Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 10/520,482

(22) PCT Filed: Jul. 8, 2003

(86) PCT No.: PCT/CN03/00541

§ 371 (c)(1),
(2), (4) Date: Sep. 23, 2005

(87) PCT Pub. No.: WO2004/006592

PCT Pub. Date: Jan. 15, 2004

(65) Prior Publication Data

US 2006/0089140 A1    Apr. 27, 2006

(30) Foreign Application Priority Data

| Jul. 8, 2002 | (CN) | ................................. 02 1 23902 |
| Jul. 8, 2002 | (CN) | ................................. 02 1 23904 |
| Sep. 9, 2002 | (CN) | ................................. 02 1 29995 |

(51) Int. Cl.
*H04W 4/00* (2006.01)

(52) U.S. Cl. .................. 455/432.1; 455/433

(58) Field of Classification Search .............. 455/432.1, 455/433

See application file for complete search history.

(56) References Cited

U.S. PATENT DOCUMENTS

| 4,833,701 | A |   | 5/1989  | Comroe et al. ................ 379/60 |
| 5,878,348 | A |   | 3/1999  | Foti ........................... 455/434 |
| 5,884,169 | A | * | 3/1999  | Uchiyama et al. ........... 455/433 |
| 5,978,673 | A | * | 11/1999 | Alperovich et al. ......... 455/417 |
| 5,978,678 | A | * | 11/1999 | Houde et al. ................ 455/433 |
| 6,119,001 | A |   | 9/2000  | Delis et al. .................. 455/433 |
| 6,259,914 | B1 | * | 7/2001 | Koster ..................... 455/432.1 |
| 6,587,688 | B1 | * | 7/2003 | Chambers et al. ........... 455/433 |
| 6,615,037 | B1 | * | 9/2003 | Bharatia et al. ............. 455/417 |
| 6,871,069 | B1 | * | 3/2005 | Cho ........................... 455/433 |
| 6,996,396 | B1 | * | 2/2006 | Snapp ........................ 455/417 |

FOREIGN PATENT DOCUMENTS

CN    1143441 A    2/1997

(Continued)

*Primary Examiner*—Patrick N. Edouard
*Assistant Examiner*—Shantell Heiber
(74) *Attorney, Agent, or Firm*—Ladas & Parry LLP

(57) ABSTRACT

A network for implementing localized roaming of mobile subscribers includes: a base transceiver station, a base station controller, a Mobile Switching Center (MSC), a Visiting Location Register (VLR) and a Home Location Register (HLR), and at least one Roaming Number Manager (RNM); wherein said RNM, connected with the HLR in the home network and an MSC/VLR in a contracted roaming network, and manages mobile phone numbers in the home network and local mobile phone numbers in the contracted roaming network, takes collection of the local mobile phone numbers in the contracted roaming network as a resource pool, and allocates the mobile phone numbers in the contracted roaming network to subscribers roaming in the contracted roaming network dynamically through the MSC/VLR in the contracted roaming network.

19 Claims, 11 Drawing Sheets

FOREIGN PATENT DOCUMENTS

| | | |
|---|---|---|
| CN | 1225787 A | 8/1999 |
| CN | 1238112 A | 12/1999 |
| EP | 1 220 558 A1 | 7/2002 |
| WO | 98/03028 | 1/1998 |
| WO | 98/11754 | 3/1998 |
| WO | 00/79827 A1 | 12/2000 |
| WO | 01/60099 A1 | 8/2001 |

* cited by examiner

NETWORK AND METHOD OF REALIZING LOCAL ROAMING FOR SUBSCRIBERS

FIELD OF THE INVENTION

The present invention relates to a mobile communication network as well as a method for implementing roaming of mobile subscribers.

BACKGROUND OF THE INVENTION

In the traditional mobile phone roaming procedure, communication links have to be established between the mobile networks both in the home region and in the roaming region to support calls of mobile subscribers in roaming state and to enable mobile subscribers in roaming state to use diverse telecom services, such as initiating calls or answering calls, etc. However, since communication route is long and more network resources are consumed in roaming state, the service cost in roaming state is higher than that in normal state. Especially, in international roaming state, any call to the subscriber is international toll call, i.e., the call has to be accomplished through the voice path between the mobile network in the home country and that in the roaming country; therefore, the roaming subscriber has to pay the international toll cost from the home country to the roaming country; even though the caller is within a stone's throw to the roaming subscriber (e.g., when two members in a tourist party are calling in a roam region), both parties have to pay the toll for international call. As a result, the communication demand of roaming subscribers is suppressed by the expensive cost. Therefore, people are eager to implement localized roaming of mobile phones to decrease expensive roaming call cost.

However, the traditional mobile networks can't meet such a demand. The structure of a typical traditional mobile network is shown in FIG. 1. As shown in the network in home country in FIG. 1, the network entities related to mobile phone roaming processing in a traditional network include a Base Transceiver Station (BTS), a Base Station Controller (BSC), a Mobile Switching Center (MSC), a Visiting Location Register (VLR) and a Home Location Register (HLR). For example, when the subscriber's mobile phone is roaming in different countries, the mobile phone has to use its number N in the home country wherever it is because the number of the mobile phone N is stored in the HLR of the subscriber's home network. A call to the roaming subscriber has to be switched to the home country of the subscriber, so that the MSC in the subscriber's home country can query HLR in the home country about the route and establish the voice path to the roaming country. However, in many cases, this is unnecessary; for example, when the caller is in the roaming country where the called subscriber is or a call is initiated from the third country except for the home country or the roaming country where the called subscriber is. Even though it is unnecessary, the roaming subscriber has to bear the charge for international toll call from the home country to the roaming country.

The reason for above case lies in the process to called number by the switching device. An international call is first routed to a gateway office in the called subscriber's home country, herein a further determination for the called number's property; if it is a mobile phone number, the call is routed to GMSC in the mobile network for subsequent process. Each country has its independent numbering scheme, so switching devices in one country cannot determine number properties of other countries, i.e., the called is a telephone or mobile phone, because this requires a large quantity of configuration data, and it is more important that change of numbering scheme in each country will affect other countries, and this will cause numbering schemes in countries lack of independence.

For solving said problem, the mobile subscriber can use a local number in a roaming region/network. Viewed from the point of the roaming region/network, some local mobile phone numbers are allocated for foreign subscribers roaming in the region/network. And the roaming subscriber can share local services using the local number.

SUMMARY OF THE INVENTION

To solve above problem, the present invention provides a network for implementing localized roaming of mobile subscribers and a method for implementing localized roaming network, localized roaming of mobile subscribers can be implemented at lower cost and with lower network resource occupation through the network and method provided by the present invention.

To implement localized roaming service, the network for implementing localized roaming of mobile subscribers includes: a base transceiver station, a base station controller, a Mobile Switching Center (MSC), a Visiting Location Register (VLR) and a Home Location Register (HLR), and at least one Roaming Number Manager (RNM);

Wherein the RNM, connected with the HLR in the home network and an MSC/VLR in a contracted roaming network, and manages mobile phone numbers in the home network and local mobile phone numbers in the contracted roaming network, takes collection of the local mobile phone numbers in the contracted roaming network as a resource pool, and allocates the mobile phone numbers in the contracted roaming network to subscribers roaming in the contracted roaming network dynamically through the MSC/VLR in the contracted roaming network.

The Roaming Number Manager (RNM) may be embedded in the HLR.

The method for implementing localized roaming of mobile subscribers based on the network includes:

a. configuring the RNM with local mobile phone numbers in the contracted roaming network, an independent Public Switched Telephone Network/Integrated Service Digital Network (PSTN/ISDN) number and a signaling point code;

b. configuring data in entities of the contracted roaming network and entities of the home network, so that the subscriber location query message taking a local number in the roaming network as the destination address will be directed to the RNM in the home network;

c. establishing interfaces between the RNM and entities of the contracted roaming network as well as between the RNM and entities of the home network;

d. developing communication services in the roaming network based on the configuration in respective entities of the contracted roaming network and the home network, implementing localized roaming of the subscriber.

The step c includes:

c1. establishing an interface between the RNM and an MSC in the roaming network;

c2. establishing an interface between the RNM and the HLR in the home network.

The step d includes a subscriber location update process:

d1. sending a location update request from the VLR currently serving the subscriber to the HLR in the home network;

d2. according to the location update request received from the VLR and the current location of the subscriber, addressing the RNM corresponding to the current location of the subscriber through the PSTN/ISDN number of RNM and informing the RNM of the subscriber location update, by the HLR in the home network;

d3. allocating by the RNM a local mobile phone number in the roaming network, to the subscriber, and returning said number to the HLR in the home network;

d4. inserting said local mobile phone number in the roaming network into the VLR currently serving the subscriber, and returning an acknowledgement message of obtaining said number in the roaming network to the RNM, by the HLR in the home network.

The step d3, before allocating a local mobile phone number to the subscriber, further includes: determining by the RNM whether the roaming region where the subscriber is roaming is a contracted roaming region; if so, allocating one from the available numbers in the contracted roaming network and feeding the allocated number back to HLR in the home network by the RNM; otherwise feeding the mobile phone number of the subscriber in the home network to HLR in the home network.

An incoming call or an outgoing call is processed by using the number fed back from RNM in the home network.

The call is processed by using the number fed back from RNM in the home network in the following manner: when acting as the caller, the subscriber uses the number fed back from the RNM in the home network to initiate a call; when the subscriber acts as the called party, if the called number is the mobile phone number in home network, the MSC in the home network queries HLR in the home network to determine the calling route, the HLR finds the corresponding subscriber record, obtains address of VLR currently serving the subscriber, and accesses the VLR to obtain the calling route, with which the HLR instructs the MSC in the home network to establish a calling route; if the called number is a local mobile phone number in a roaming region, the MSC in the roaming network queries RNM about calling route, the RNM finds the subscriber identifier, queries the HLR about the calling route in accordance with the subscriber identifier, and forwards the calling route returned from HLR to the MSC in the roaming network.

The method further includes: when the subscriber leaves the contracted roaming network, the HLR in the home network informs the RNM of the subscriber location update, the RNM releases the local mobile phone number, occupied by the subscriber, in the roaming network, and breaks the mapping between the number and the subscriber.

The VLR in step d1 addresses the HLR in the home network in accordance with International Mobile Subscriber Identifier (IMSI) of the subscriber.

The information carried in the location update request sent from VLR to HLR in step d1 and the parameters carried in the location update informed from HLR to RNM in step d2 include: the IMSI of the subscriber and/or the mobile phone number in the home network, current location of the subscriber and old location of the subscriber.

Since a RNM is configured in the network provided by the present invention, a local mobile phone number in the roaming region can be allocated to the subscriber through the RNM according to the mobile subscriber's roaming region, and the number is released when the subscriber leaves the roaming region; therefore the subscriber can use the number in its roaming region during roaming to initiate calls or answer calls and thus enjoy localized roaming service, for example, the subscriber needn't to pay the charge for international long distance call when he/she answers the call; such a network can reduce network resource occupation when mobile subscribers communicate in roaming state, and reduces greatly subscribers' communication cost in roaming state; for operators, the network according to the present invention can provide a new localized roaming service and can extend services to other regions or countries to exploit new markets, attract subscribers, improve subscriber's loyalty, and encourage subscribers to use mobile phones in roaming state; in addition, the present invention requires little modification to traditional mobile networks, low cost and convenient implementation.

In the method according to the present invention, since reasonable addressing for RNM as well as respective communication processing, the HLR can obtain services from different RNMs according to the subscriber's roaming region, and a single RNM can provide services for a plurality of HLRs; thereby the flexibility of network structure is enhanced, and utilization rate of numbers in the roaming region is improved; the interfacing between mobile communication network devices is simplified; the impact of implementation of localized roaming to traditional mobile communication networks is reduced, i.e., RNMs should be introduced into traditional mobile networks to implement localized roaming with minimum impact.

DETAILED DESCRIPTION OF THE EMBODIMENTS

The localized roaming described in the present invention refers to that the subscriber's mobile phone in roaming state obtains a local number in the roaming region and initiates calls or answer calls with the number, so that the subscriber can utilize network resource in the roaming region and enjoy localized services, similar to a local subscriber in the roaming region, and thus avoiding unnecessary voice path detour and reducing communication cost in roaming state.

In the implementation of localized roaming of mobile phones according to the network provided by the present invention, a mobile phone (subscriber) when roaming is automatically allocated with a local mobile phone number in the roaming region by its home network if the roaming region is a contracted roaming region (which has reached some agreement with the home operator). When the subscriber leaves the contracted roaming region, the home network releases the temporary number used by the subscriber. In the contracted roaming region, the subscriber uses the local number to initiate calls or answer calls and enjoy localized roaming service. For example, when the subscriber is roaming in a roaming country, the subscriber needn't to pay the charge for international toll calls when he/she answers calls; thus the communication cost in roaming state is reduced greatly.

The present invention will be described in further detail taking the roaming across countries as an example, with reference to the attached drawings.

Figure 1:
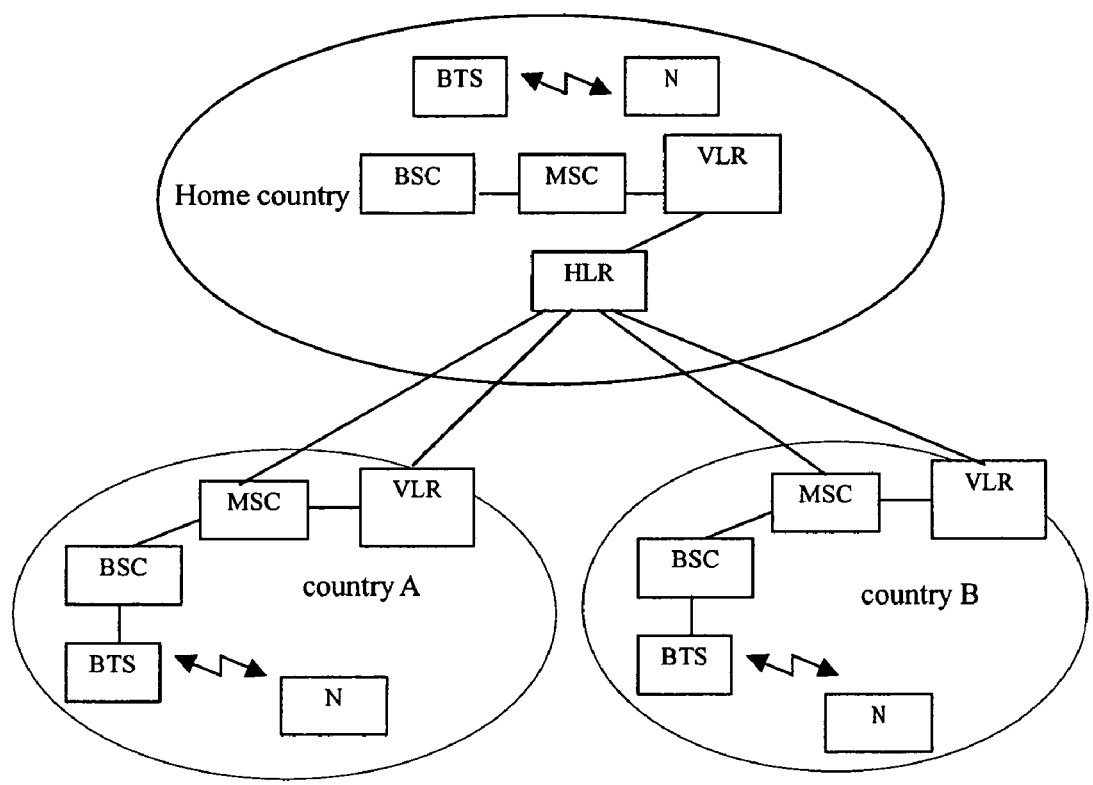
FIG. 1 is the structural diagram of a traditional cellular mobile communication network.
Figure 2:
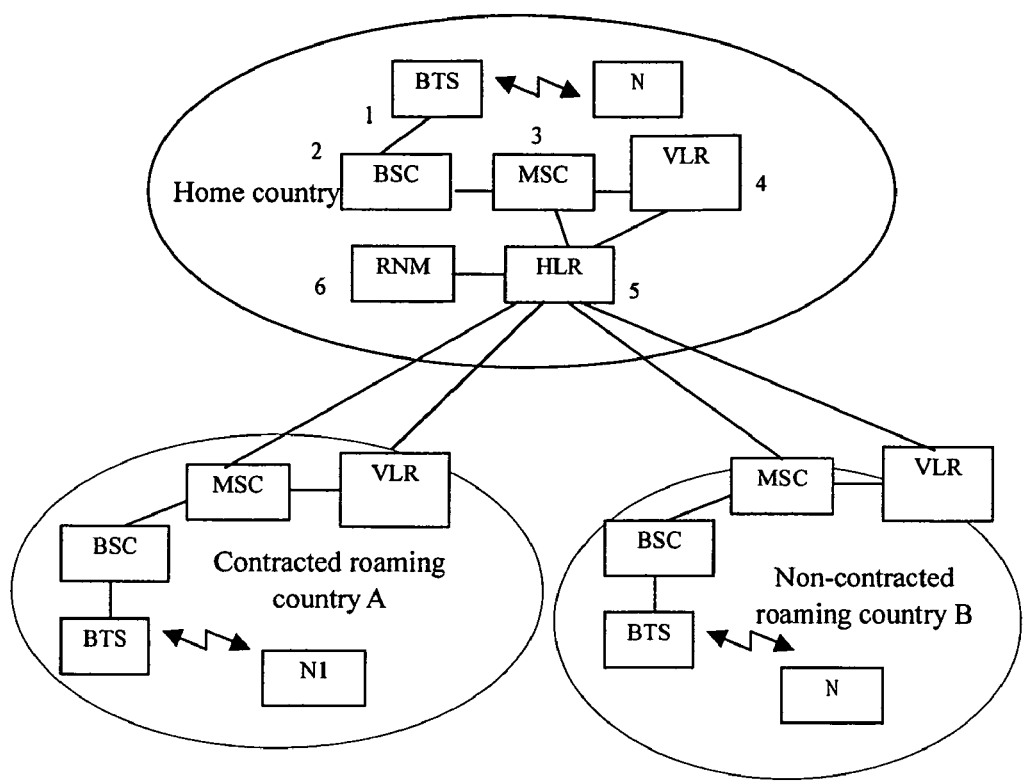
FIG. 2 is the structural diagram of the cellular mobile phone network according to the first embodiment of the network of the present invention.

FIG. 2 is the structural diagram of the cellular mobile phone networks according to embodiment 1 of the present invention. As shown in FIG. 2, there are 3 networks. The network entities according to the present invention refer to the home network, which comprises: a Base Transceiver Station (BTS) 1, a Base Station Controller (BSC) 2, a Mobile Switching Center (MSC) 3, a Visiting Location Register (VLR) 4 and a Home Location Register (HLR) 5, and a Roaming Number Manager (RNM) 6 connected with HLR 5;

The RNM 6 is a network entity, which is used to manage mobile phone numbers in the contracted roaming country; the RNM takes the collection of obtained mobile phone numbers in the contracted roaming country as a resource pool, and allocates the mobile phone numbers in the contracted roaming country to roaming subscribers dynamically; furthermore, RNM is also used to:

(1) store mobile phone numbers in the contracted roaming country;

(2) determine the current default phone number of the subscriber. When the subscriber roams to the contracted roaming country, the RNM allocates a mobile phone number from the available numbers in the contracted roaming country to the subscriber as the current default phone number of the subscriber in the roaming country, and stores the mapping between the subscriber and the number; otherwise RNM designates the subscriber's mobile phone number in the home country as the current default phone number of the subscriber in the roaming country;

(3) release the local phone number in the contracted roaming country which is allocated to the subscriber. When the mobile phone subscriber leaves the contracted roaming country and registers his/her location in another country, the HLR in the home country inform the RNM in the home country of the subscriber's location update to indicate that the subscriber has moved out of the country; in this case, RNM releases the local mobile phone number occupied by the subscriber and break the mapping between the number and the subscriber. The time span from allocation of the number to releasing is called the life time of the number;

(4) take an appropriate policy to reuse the released local number in the contracted roaming country. To avoid any possible subscriber number conflict in the dynamic allocation process, RNM reuses released numbers with certain anti-conflict policies or combinations of policies. A simple but practicable policy is: the released number is locked temporarily within a certain time period, which is proportional to the life time of the number; after the time period, the number may be reallocated to a roaming subscriber. RNM stores and exercises above policies.

(5) bind a number in the contracted roaming country to the subscriber. According to the demand of mobile phone subscriber, a number in the contracted roaming country is bound to the subscriber for a long term, and the number can't be allocated to any other roaming subscriber. Even if the subscriber is not in the roaming country, the mapping between the number and the subscriber is still maintained. Above operation is called number binding, and the binding relation is stored in the RNM in the home country.

If the network shown in FIG. 2 is used, the operator delivering localized roaming service requires obtaining mobile phone numbers in some roaming countries for the roaming service; those countries are called contracted roaming countries, and the amount of the required phone numbers in a contracted roaming country relates to the number of subscribers roaming in that country. The more the roaming subscribers are, the more the required phone numbers are. As shown in FIG. 2, in the home country, the subscriber uses number N; in the contracted roaming country A, he/she uses a local mobile phone number N1; in the non-contracted roaming country B, he/she still use the mobile phone number N in the home country.

In the cellular mobile communication network in the embodiment shown in FIG. 2, the Base Transceiver Station (BTS) 1 is a device that transmits or receives radio signals and serves a certain area and establishes radio connections with mobile phone in the area; the BTS 1 is connected to the Base Station Controller (BSC) 2, which manages radio resource and controls the operation of BTS 1; the Mobile Switching Center (MSC) 3 is mainly designed to control mobile call process; the Visiting Location Register (VLR) 4 is designed to store the data of mobile phone subscribers that are roaming in the region dominated by it. All of above devices are standard ones in a mobile communication network. The HLR, VLR, MSC, and RNM cooperate with each other to manage mobile subscribers.

Hereunder the network provided by the present invention and RNM are further described with the interaction between RNM and HLR in the mobile phone location update and route query process:

In the network shown in FIG. 2, first, the home country where the mobile phone obtains some mobile phone numbers in the contracted roaming country; when a mobile phone is roaming into the contracted roaming country, it registers its location at the local VLR through BTS, BSC and MSC; the VLR initiates a location update request to the subscriber's HLR. The HLR determines the location change of the subscriber's mobile phone; the HLR informs RNM that the subscriber's location has changed and requests to allocate a mobile phone number in the roaming country to the subscriber's mobile phone. The RNM determines if the subscriber is in a contracted roaming country; if the subscriber is in a contracted roaming country and is the first entry (no local number has been allocated to the subscriber) into the country, the RNM allocates a number from the available mobile phone numbers in the contracted roaming country and feeds the number back to HLR, and stores the mapping between the number and the subscriber (the mapping may involve multiple numbers, such as the number in the home country, the temporary local number in the roaming region, and bound numbers); if not, the RNM feeds the number in the subscriber's home country back to HLR. The above number fed back by RNM to HLR is called the current default number of the subscriber. The HLR inserts the current default number of the subscriber fed back by the RNM in the home country and other data in the VLR of the current region where the subscriber is, deletes the subscriber record in the original VLR, updates the mobile phone location information in the subscriber record, and informs the subscriber of the current default phone number; if the current default phone number doesn't change, the notification procedure may be omitted. In FIG. 2, when the subscriber roams from the home country into the contracted roaming country A, the HLR in the home country allocates a local mobile phone number N1 in the roaming country to the subscriber, and inserts number N1 and other data of the subscriber in the VLR in country A where the subscriber is currently, deletes the subscriber record in the VLR in home country, and informs the subscriber of the current default phone number N1; if the subscriber roams into the non-contracted roaming country B, the RNM instructs to use the mobile phone number N in the home country; the HLR in the home country inserts number N and other data of the subscriber (e.g., contract data) in the VLR in country B the subscriber is.

When the subscriber answers an incoming call or initiates an outgoing call in the contracted roaming country, the subscriber's mobile phone uses the mobile phone number in the current roaming country to process the call. That is to say, when the mobile phone of the roaming subscriber serves as a caller, it uses the temporary number allocated by RNM (i.e., the current default mobile phone number of the subscriber) to initiate the call; when it is a called, the caller may dial the local mobile phone number in the roaming country or the mobile phone number in the home country, and the MSC in the roaming country (if the caller dials the number in the roaming country) queries RNM about the calling route or the MSC in the home country (if the caller dials the number in the home country) queries the HLR in the home country about the calling route; in the former case, RNM finds the subscriber identifier according to the called number in roaming country, and then queries HLR about the route. The HLR finds the corresponding subscriber record and obtains subscriber location information (i.e., VLR number in the current roaming country), and thus obtains the routing information through accessing the VLR in the roaming country, and then instructs the MSC to establish the call. In the RNM in the home country, if any number maps to a subscriber, the mapping is unique; however, a subscriber may correspond to numbers in different countries; no matter which number is dialed by the caller, HLR can find the unique subscriber record and thus obtain the subscriber location information. In FIG. 2, when the subscriber roams into country A, the calling subscriber who calls the roaming subscriber may dial either number N or N1.

Only when the country after subscriber location update varies, the action of allocating a mobile phone number in the roaming country will be triggered. As long as the subscriber stays in the country, above number will be used, until the subscriber's mobile phone registers its location in another network. After above phone number allocation process is finished, the network will inform the roaming subscriber of the temporary number in the local roaming country in some ways: short message, voice or Unstructured Supplementary Service Data (USSD) are possible ways to be used, depending on the capability of the network and the operator's choice.

When the mobile phone subscriber leaves the contracted roaming country and enters into another country, the HLR in the home country will inform the RNM of the subscriber location update (i.e., the subscriber leaves the country), RNM will release the local mobile phone number occupied by the subscriber and break the mapping between the number and the subscriber. The time span from allocation to releasing is called the life time of the number. For example, as shown in FIG. 2, when the roaming subscriber leaves country A, RNM will releases number N1.

In addition, to avoid any possible conflict between subscriber numbers during dynamic allocation, certain anti-conflict policies may be used to reuse the released numbers. In this embodiment, the policy is: the released number is locked (unavailable) temporarily within a certain time period, which is proportional to the life time of the number; after that time period, the number may be reallocated to another roaming subscriber.

If a mobile phone subscriber frequently travels between the home country and a contracted roaming country and requires to possess a number in the contracted roaming country for a long term, a number may be allocated to the subscriber from the available numbers in the contracted roaming country as a fixed number, which will not be allocated to any other roaming subscriber; even though the subscriber leaves the contracted roaming country, the mapping between the number and the subscriber is still maintained. Above operation is called number binding. When the subscriber roams into above contracted roaming country, the HLR in the home country is triggered by a location update request to request the RNM to allocate a local mobile phone number to the subscriber, RNM will return the bound number to HLR, so that the subscriber is enabled to use the bound number to process calls. When the subscriber doesn't need the bound number any more, the binding may be broken, and the number will be released and reused. Certainly, numbers in multiple contracted roaming countries may be bound to a subscriber.

When the caller dials a bound number of the called subscriber, the RNM will find the subscriber corresponding to the number through query, find the subscribers record, and obtain the subscriber's location information (VLR number) via HLR, to accomplish route query. Therefore, if the called subscriber has a bound number, the caller will have more choices: the called subscriber's number in the home country, the bound numbers, or the number in the current contracted roaming country.

Figure 3:
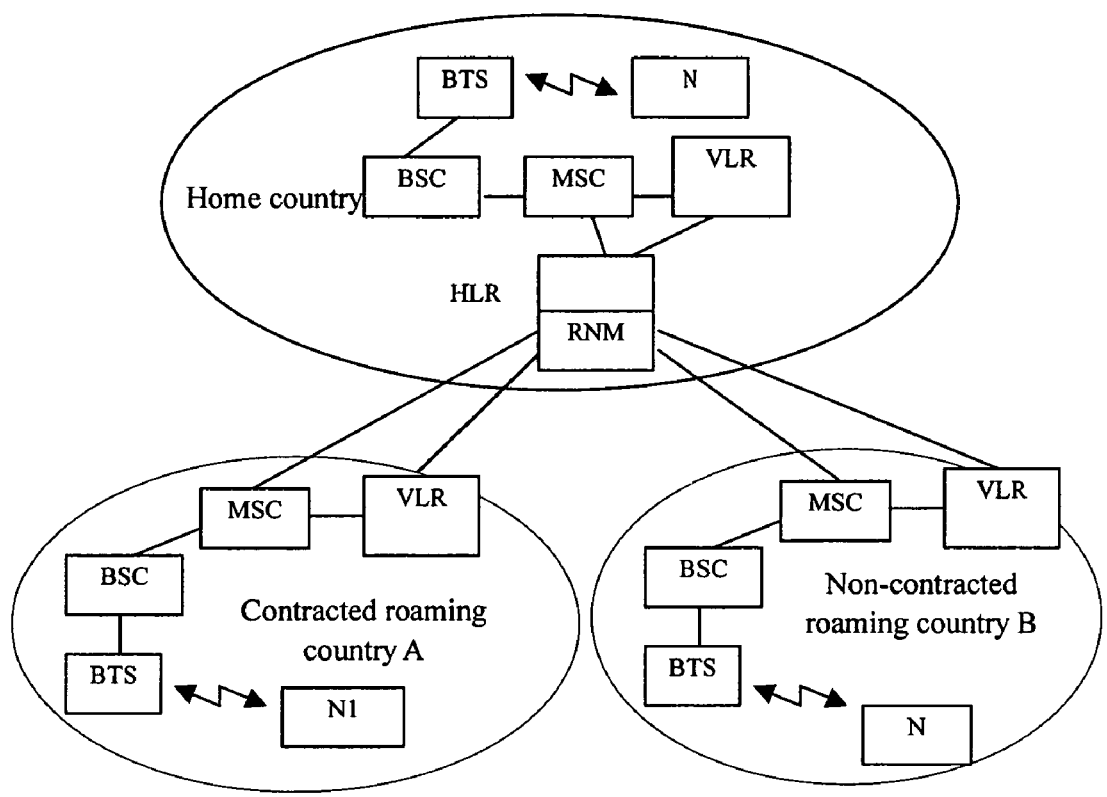
FIG. 3 is the structural diagram of the cellular mobile phone network according to the second embodiment of the network of the present invention.

FIG. 3 shows a preferred embodiment 2 according to the present invention, wherein RNM is integrated into HLR as a module. In the embodiment 2, the HLR is enhanced in functionality: it not only stores subscriber data (including subscriber identification number, current default mobile phone number, type of contracted service, current location (VLR number, MSC number), etc.) but also delivers the following functions: managing mobile phone numbers obtained from the contracted roaming countries, allocating temporary mobile phone numbers in the roaming countries to roaming subscribers, and storing mapping between subscribers and numbers, and release the temporary numbers used by the subscribers when subscribers leaves the contracted roaming countries.

Figure 4:
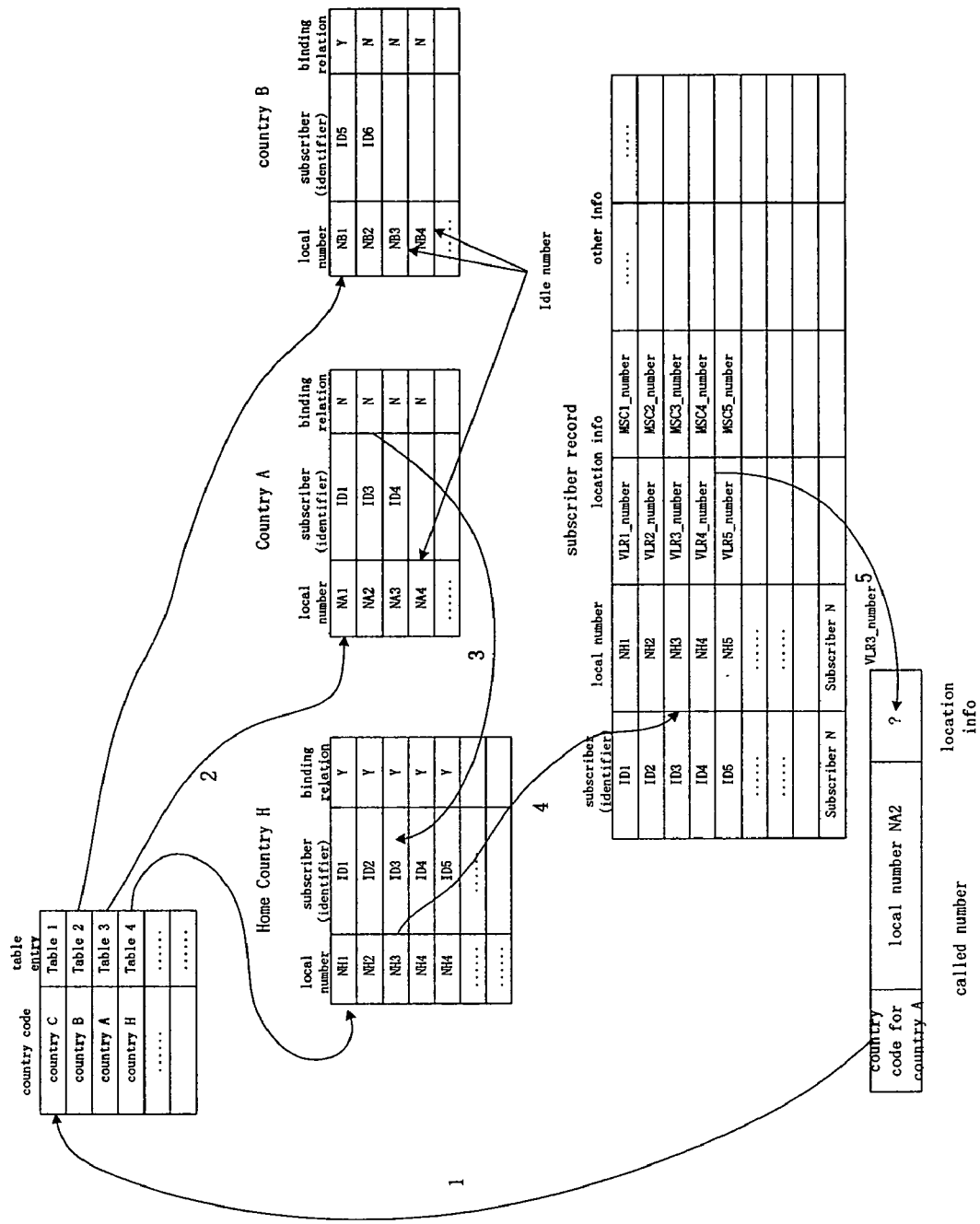
FIG. 4 is a suggested data structure employed in the network of the present invention.

FIG. 4 is a suggested data structure employed in the network of the present invention.

The data structure shown in FIG. 4 comprises three tables including a country index table, a local mobile phone number table and a subscriber record table. Herein, the country index table lists home countries, contracted roaming countries and entry addresses of the local mobile phone number table corresponding to these countries, through which the local mobile number table of the contracted roaming countries and the home countries can be found, countries not listed in the table are non-contracted roaming countries; the local mobile phone number table stores the mobile phone numbers allocated by the contracted country and their status in a country; the subscriber record table stores subscriber data, e.g., subscriber location information, subscriber subscription information. In the conventional network, the subscriber record table can be found in HLR.

In the conventional network, a subscriber have only the mobile phone number in the home country, the HLR obtains subscriber location information through looking up the subscriber record table according to the mobile phone number in the home country; according to the present invention, a subscriber may have more than one mobile phone numbers in different regions/networks: a number in the currently roaming region, a number in the home country and bound numbers in contracted roaming countries if any. The subscriber location information can be found according to any one of above numbers, and thus routing information is obtained. The procedure in which subscriber location information is queried according to the subscriber's number in roaming region or the bounds number in contracted roaming country is shown in FIG. 4.

A subscriber which has a number NH in the home country is roaming in contracted roaming country A, and the subscriber is allocated for a local mobile phone number NA2.

1. querying for the country code contained in called number in country index table, and obtaining the entry address of local phone number table of the corresponding roaming country;

2. obtaining the subscriber identifier through querying about NA2 in the local mobile phone number table in contracted roaming country A;

3. querying about the subscriber identifier in the local phone number table of home country, and obtaining the subscriber's mobile phone number in its home country;

4. querying about the subscriber identifier in subscriber record table, finding subscriber record corresponding to the subscriber, and obtaining the location information; the steps 1-3 are implemented in RNM, and step 4 is implemented in HLR.

If the RNM is integrated in HLR, step 3 can be omitted after step 2, and subscriber location information is obtained through directly querying about subscriber identifier in the subscriber record table. This is shown in FIG. 4.

In the method according to the present invention, the operator that provides localized roaming service needs to obtain the numbers in certain roaming regions/networks for roaming service; these numbers are called contracted numbers, and the regions/networks that provide these numbers are called contracted roaming regions/networks. For contracted numbers, their physical home region/network is the contracted roaming region/network; whereas their logical home region/network is the original home network where the localized roaming service is provided.

To implement localized roaming service, new functional entities—RNM is introduced in traditional cellular mobile communication networks. A RNM may manage mobile phone numbers in different regions/networks; whereas the mobile phone numbers in different regions/networks may be managed by different RNMs, i.e., a RNM can provide service for a plurality of HLRs, and a HLR can obtain service from different RNMs, depending on the subscriber's roaming region.

Figure 5:
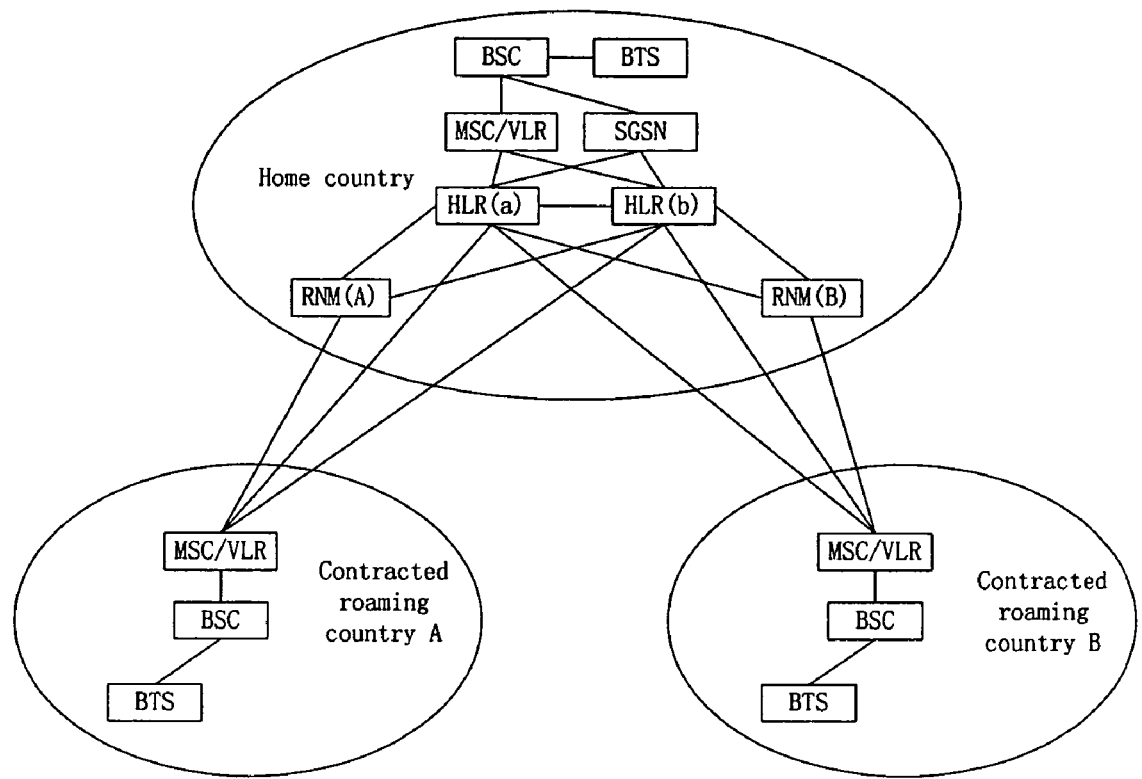
FIG. 5 is the structural diagram of the cellular mobile phone network according to the third embodiment of the network of the present invention.

FIG. 5 is the third embodiment of the present invention. FIG. 5 shows the connections between network structures and entities related with the present invention. There are 3 networks in the figure: a network in the subscriber's home country, a network in the contracted roaming country A and a network in the contracted roaming country B; wherein the cellular mobile network in the home country comprises two HLRs (HLR(a) and HLR(b)) and two RNMs (RNM(a) and RNM(b)). The RNM(a) and RNM(b) manage local mobile phone numbers provided from the networks in contracted roaming country A and B, respectively.

It should be noted that the entities in the figure are not all entities of the network.

It is seen from FIG. 5 that the structure of the cellular mobile communication network that implements localized roaming service is very flexible; there may be a plurality of RNMs and HLRs in the network; a RNM can provide service for a plurality of HLRs, so contracted numbers can be shared by subscribers of these HLRs and usage efficiency of contracted number is improved; a HLR can obtain service from different RNMs, depending on the subscriber's roaming region, in such an arrangement, numbers from a contracted roaming country are managed in a concentrated manner (the same RNM) and addressing is simplified.

Figure 6:
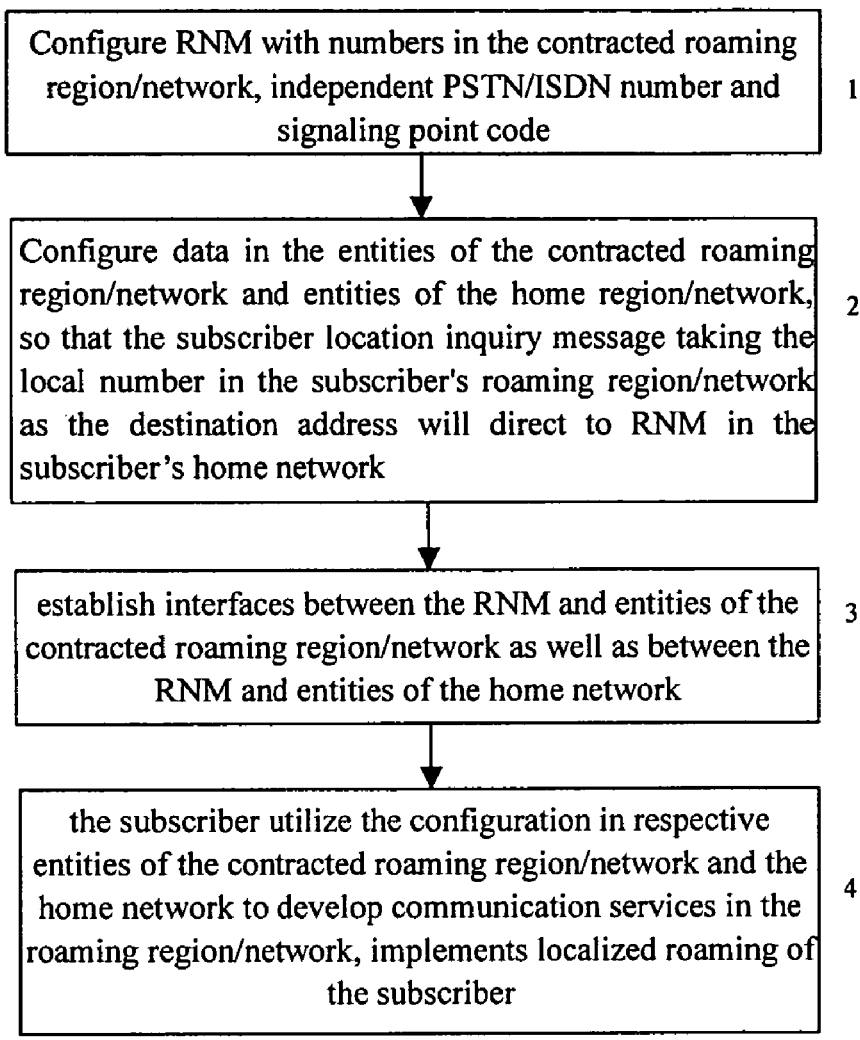
FIG. 6 is the flow diagram of the first embodiment implemented with the method according to the present invention.

Taking the Global System for Mobile Communications (GSM) as an example, the method for implementing localized roaming for subscribers in mobile communication system according to the present invention, referring to FIG. 6, the method comprises:

Step 1: allocating independent PSTN/ISDN number and independent signaling point code, so that RNM can be addressed in the telephone signaling network;

The step doesn't change the addressing for traditional entities in the cellular mobile communication network;

Step 2: configuring appropriate data in the contracted roaming region/network and the home network, so that the subscriber location query message taking the local number in the subscriber's roaming region/network as the destination address will be directed to RNM in the subscriber's home network;

For any call to a contracted number, a query about location of the called mobile phone subscriber will be made to the RNM in the logical home region/network serving the contracted number, taking the contracted number as the destination address. A signaling path from the routing query initiating entity to the RNM is configured, and routing data at the network nodes in the signaling path is configured, so that the signaling message taking the contracted number as the destination address is routed correctly to RNM through the nodes in both the roaming region/network and the home network.

Usually, subscriber location queries are often initiated from a GMSC in the physical home network of the called number. If the caller is a subscriber in a PSTN, and the network capability is available, the query may be initiated from any signaling point that supports Mobile Application Part (MAP), e.g., local exchanger, international tandem exchange center for outgoing calls, etc.

Step 3: establishing interfaces between RNM and relevant devices, including:

(1) Interface Between RNM and MSC

A GMSC/SMS GMSC (Gateway Mobile Switching Center/Short Message Service Gateway Mobile Switching Center) queries about routing information of the called subscriber in RNM, to accomplish call establishment and distribution of short messages.

The interface employs MAP (Mobile Application Part), which corresponds to the signaling between GMSC and HLR.

(2) Interface Between RNM and HLR

This interface is used to exchange information between RNM and HLR, which includes location of the mobile phone, current number of the subscriber, and current subscriber location/routing information.

When the region/network where the mobile phone changes, the HLR informs RNM of the location update of the subscriber's mobile phone; the RNM determines whether to allocate a new number in the roaming region/network for the mobile phone and cancel the number that has been previously allocated in the roaming region/network according to the current location of the mobile phone.

When the mobile phone initiates a call with the subscriber's number in the roaming region, the RNM receives a route query, then accesses the HLR serving the subscriber corresponding to the number in the roaming region, and obtains the subscriber's routing information, and returns the routing information to the query initiator;

The signaling employed by the interface is an extension to MAP (Mobile Application Part).

Above RNM addressing scheme has the following advantages:

First, it improves structural flexibility of cellular mobile communication network, i.e., a RNM can provide service for a plurality of HLRs, and one HLR can obtain service from different RNMs depending on the roaming region into which the subscriber is roaming, because subscribers, for which the localized roaming services are provided, may be distributed in different HLRs instead of converging in one HLR, in particular in the case of a large-scale network. In addition, the mobile phone numbers in different roaming regions/networks may be managed by different RNMs;

Second, it ensures security of subscriber data in the home network: since the GMSC in the roaming region can't access the HLRs in the home region directly but has to access the HLRs through the RNM in the home region and can only obtain the data of a part of subscribers in the HLR (subscribers who subscribes to localized roaming service), RNM can protect HLRs against unauthorized intrusion;

Third, the RNM is addressed through route query according to the numbers in the roaming region; thus this method avoids addressing to different HLRs and simplifies the modification of data configuration in the network. Since the subscribers in the network are distributed in different HLRs, if the contracted roaming phone numbers are allocated to the respective HLRs, the volume of signaling route configuration data described in step 2 will be increased drastically as signaling paths grow, especially when the signaling paths involve a plurality of signaling devices in the contracted roaming region/network and the home network, causing severe degradation of operability;

Forth, since some number in a roaming region is managed in a concentrated manner in RNM and shared by different subscribers in HLR, the utilization rate of the numbers is improved, the quantity of required numbers in the roaming region is decreased, and thus the interfaces between HLR and RNM are simplified. Since the subscribers in the network are distributed in different HLRs, if the contracted roaming numbers are allocated to the HLRs, the utilization rate of the numbers will be degraded, and more contracted roaming phone numbers are required.

Figure 7:
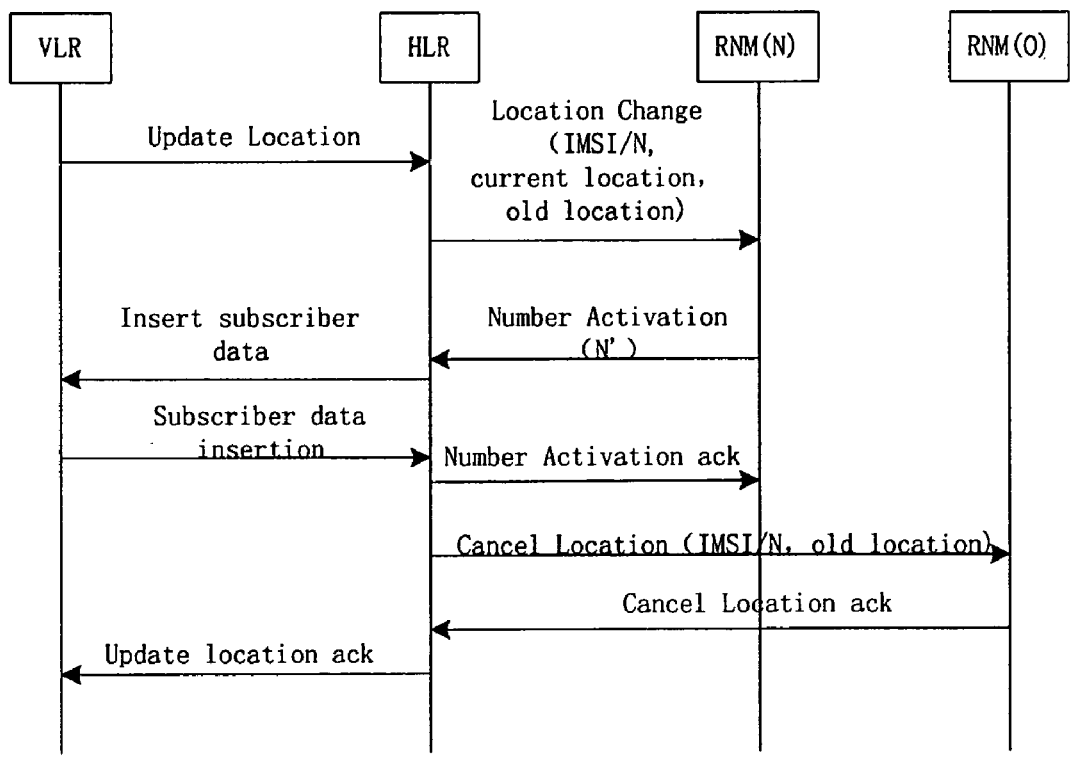
FIG. 7 is the roaming subscriber location update signaling flow used in the present invention.

Step 4: the subscriber utilizes the configuration of entities in the contracted roaming region/network and that in the home network to develop communication services in the roaming region/network; thus, localized roaming for the subscriber is implemented, the details are as follows:

1. Subscriber location update process:

The embodiment of subscriber location update process is shown in FIG. 7; wherein an RNM (N) is a RNM corresponding to the current subscriber location/network; whereas an RNM (0) is a RNM corresponding to the old subscriber location/network (before location update). During the location update process, the HLR informs the old. VLR to delete the data of the subscriber; as a well-known flow, it is not shown in the Figure; the procedures include:

The VLR at which the subscriber is registered currently sends a location update request "Update Location" to the HLR in the subscriber's home region;

2) According to the current location of the subscriber, HLR informs RNM (N) of the subscriber location update via a "Location Change" message, which shall carry at least the following messages:

Subscriber identifier: e.g., International Mobile Subscriber identifier (IMSI) and/or the subscriber's mobile phone number N in the home region;

current location of the subscriber: "current location";

old location of the subscriber: "old location";

3) When receiving the "Location Change" message, the RNM (N) instructs the current default number of the subscriber to HLR via a "Number Activation" message, the parameter of which is number indicator N'. If the RNM (N) has allocated a number to the subscriber (or the subscriber has a bound number in the roaming region/network), then N' is the number in the roaming region/network; if the RNM (N) can't allocate a number in the roaming region/network to the subscriber, then N' indicates the HLR that the current default number of the subscriber is the number N in the home region (N' may not be N but a contracted special number, because the RNM may be unable to obtain the subscriber's number in the home region); if the current location of the subscriber is in a roaming region/network different to the old roaming region/network and the RNM has allocated a mobile phone number in the old roaming region/network for the subscriber, the RNM will release that number (with the exception of number binding case);

4) the HLR inserts subscriber data in VLR utilizing a "Insert subscriber data" message; wherein the subscriber's number is the current default number instructed by RNM (N);

5) The current VLR acknowledges insertion of subscriber data to the HLR in the home region utilizing a "Subscriber data insertion" message;

6) When receiving the acknowledgement for subscriber data insertion from VLR, the HLR acknowledges the number allocation to RNM (N) utilizing a "Number activation ack" message; if the RNM (N) doesn't receive the acknowledgement from HLR for a certain period, it will release the number that has been allocated;

7) According to the old location, the HLR informs RNM (0) utilizing a "Cancel Location" message to indicate the subscriber has left; the parameters of the message include: subscriber identifier and "Old Location". If there is no binding relation between the local number occupied by the subscriber and the subscriber, the RNM (0) releases the number; the RNM (0) returns a "Cancel Location ack" message as a response to HLR; the parameter of the message is the subscriber's identifier;

8) The HLR returns an "Update location ack" message to VLR to confirm the location update process has been finished;

Both the message in step 2) and the message in step 7) carry the subscriber location information. This is necessary because a RNM may manage the numbers in a plurality of different roaming regions and thus it has to determine which number should be allocated/released according to the subscriber location.

The subscriber identifier described in above steps refers to a number that is used to distinguish the subscriber and identify subscriber identity, such as an IMSI or the subscriber's mobile phone number N in its home region.

Step 6) is carried out after step 5) is finished; thus, if session interruption between HLR and VLR leads to failure of subscriber data insertion, the RNM can't receive acknowledgement of number allocation from HLR, it will release the allocated number, thus avoiding number occupation in case of abnormalities.

Figure 8:
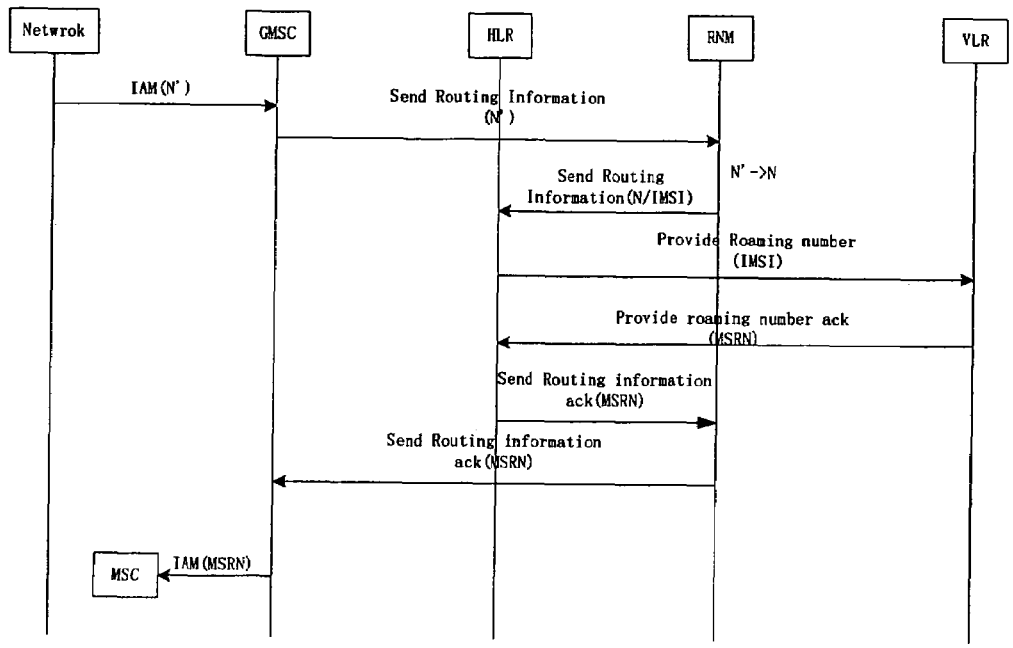
FIG. 8 is a signaling flow used in the present invention, through which the roaming subscriber is called by means of his/her number in the roaming region.
Figure 9:
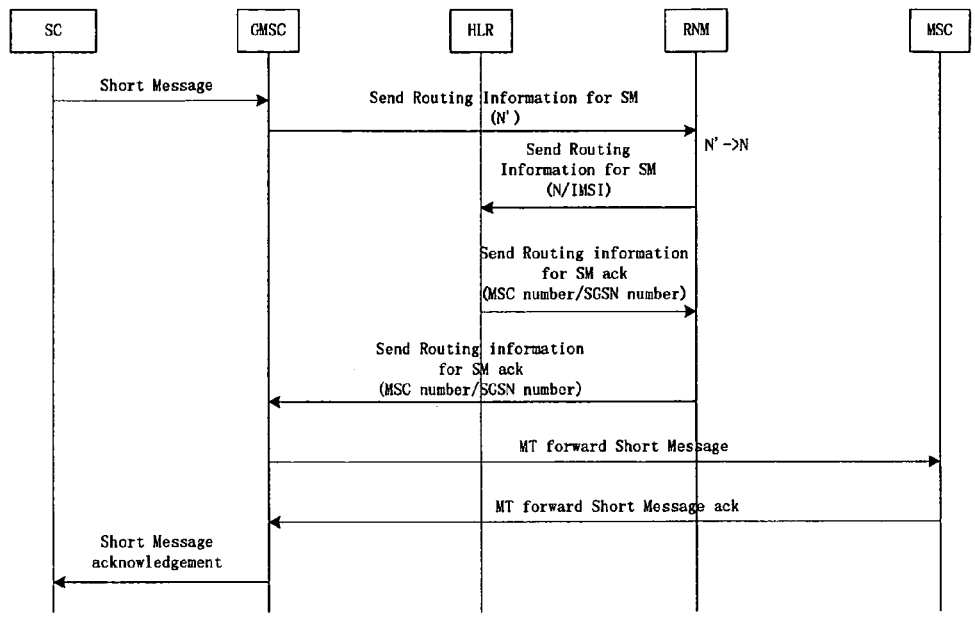
FIG. 9 is a signaling flow used in the present invention, through which a short message is sent to the subscriber by means of his/her number in the roaming region.

2. The signaling flow of calling the subscriber with the subscriber number N' in the roaming region/network (as shown in FIG. 8):

1) When a call is initiated with the called subscriber's mobile phone number N' in the roaming region/network, a GMSC in the network (usually a GMSC in the roaming region/network) will initiate a route query request to RNM;

2) When receiving the query request, the RNM finds the subscriber information according to the number in the roaming region, and send a "Send Routing Information" message with the subscriber identifier (IMSI or the number N in the home region) to query the HLR in the home region about the route;

3) the HLR sends a "Provide Roaming Number" message to VLR to request to allocate a roaming number; the request contains the subscriber's IMSI;

4) the VLR returns "Provide Roaming number ack" message to HLR to provide the allocated roaming number MSRN;

5) the HLR returns a "Send Routing Information ack" message to RNM to provide the route query result;

6) the RNM forwards the "Send Routing Information ack" message to the GMSC to provide route query acknowledgement, in order to instruct the route for GMSC with the roaming number obtained from HLR;

3. The signaling flow of sending short messages to the subscriber's number N' in the roaming region/network (as shown in FIG. 9)

The process through which short messages are submitted to the short message service center is irrelevant to the present invention. The Figure only illustrates the signaling flow of sending a short message from the short message service center to mobile phone. The short message service center (SC) and SMS GMSC in the Figure may be in any network, as long as the interface is compatible to the home network where the subscriber is; the process through which SC issues a short message is as follows:

1) The SC sends a short message to SMS GMSC, which initiates a route query to RNM;

2) When receiving the query request, RNM queries about the subscriber information according to the number in the roaming region, and sends a "Send Routing Information for SM" message with subscriber identifier (IMSI or the number N in the home region) to the HLR in the home region to query about the route;

3) The HLR sends a "Send Routing Information for SM ack" message to RNM to return the MSC number or SCSN number in the region where the subscriber stays;

4) The RNM forwards the "Send Routing Information for SM ack" message to SMS GMSC as the acknowledgement for route query, to indicate the route for the short message according to the MSC number or SGSN number obtained from HLR;

5) The SMS GMSC sends the short message to the MSC or SGSN.

Figure 10:
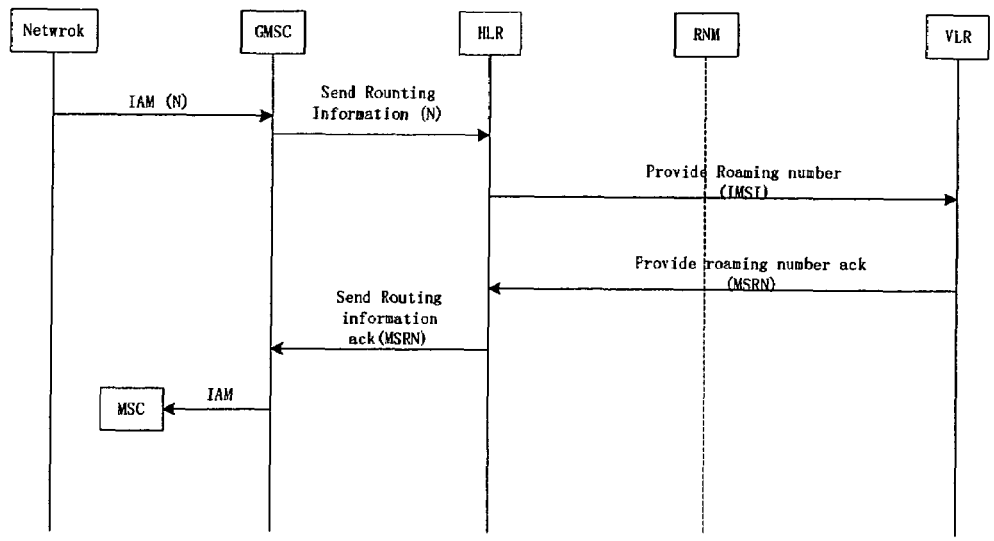
FIG. 10 is a signaling flow used in the present invention, through which the roaming subscriber is called by means of his/her mobile phone number in the home region.

The present invention doesn't require any change to traditional service features in the mobile communication networks; neither does it affect the traditional flows in the mobile communication networks. Taking the signaling flow of calling the subscriber with the number N in the home country H as an example, this advantage will be described, referring to FIG. 10.

1) When a call is initiated with the called subscriber's mobile phone number N in the home region, a GMSC in the network (usually a GMSC in the home network) initiates a route query request to HLR through a "Send Routing Information" message;

2) When receiving the query request, HLR sends a "Provide Roaming number" message to the VLR in the region where the subscriber is to request to allocate a roaming number;

3) The VLR allocates a roaming number MSRN, and returns it to HLR through a "Provide Roaming number ack" message;

4) The HLR sends a route query acknowledgement to GMSC through a "Send Routing Information ACK" message, to instruct GMSC to establish calling route with the roaming number MSRN;

Above process is the same as the process through which a mobile subscriber in the traditional cellular mobile communication network is called; it will not be affected as more RNMs are added to the network.

Figure 11:
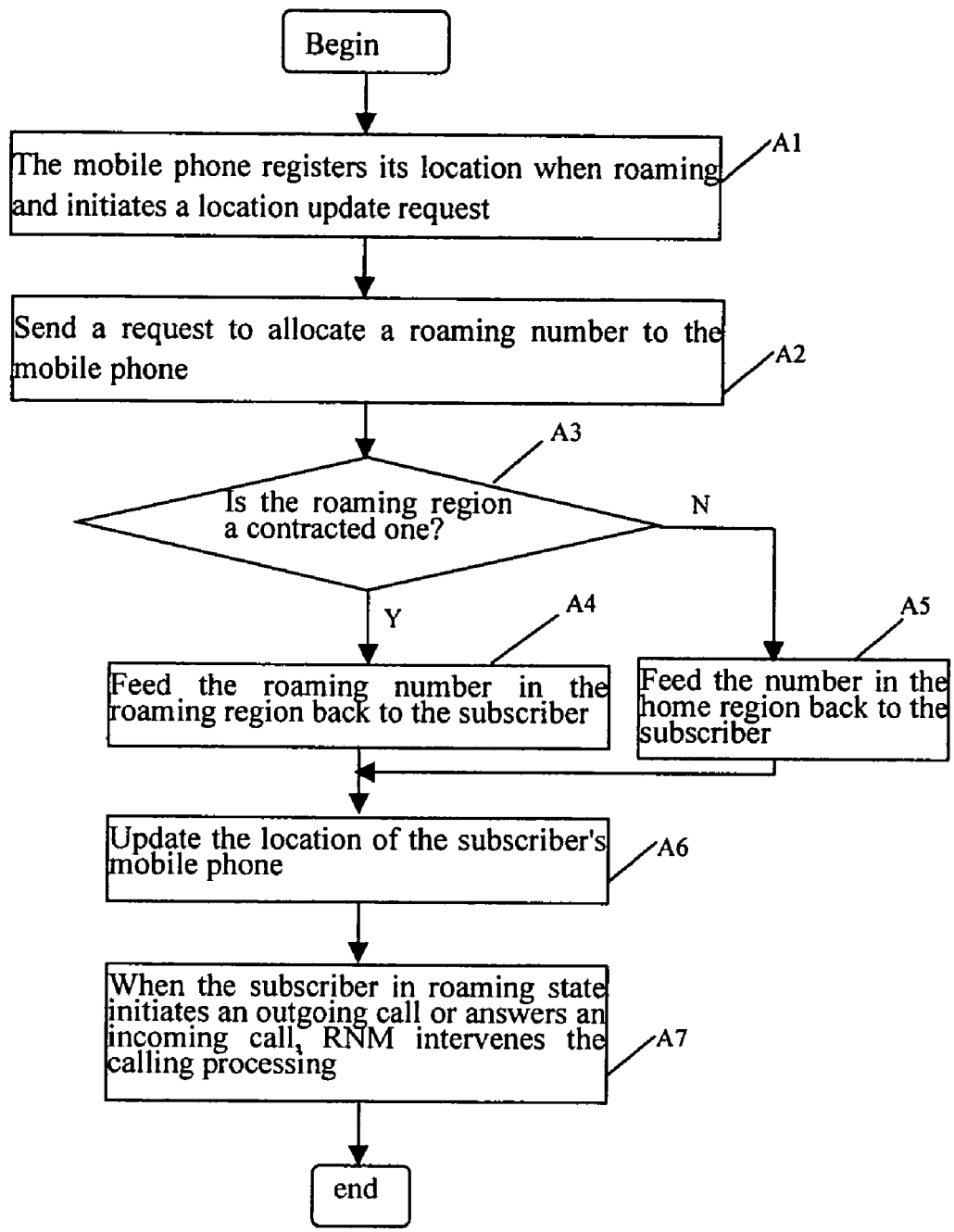
FIG. 11 is the flow diagram of the second embodiment of the method of the present invention.

FIG. 11 is the flow diagram of the second embodiment implemented with the method of the present invention. In this embodiment, taking subscriber roaming in a contracted roaming country and a non-contracted roaming country as an example, the present invention is further described. For convenience, it is supposed that only one RNM is used in the networks of each country.

As shown in FIG. 11, with the method described in the present invention, the roaming service operator needs to obtain some local mobile phone numbers in other country for the international roaming service; these countries are called contracted roaming countries, the amount of the required phone numbers in a contracted roaming country depends on the number of subscribers roaming in that country; the more the roaming subscribers are, the more the numbers are required.

Please see FIG. 2, which is the structural diagram of a cellular mobile phone network implemented with the method of the present invention. FIG. 2 illustrates the network devices related with the present invention and the connections among the devices. As shown in the Figure, for the same subscriber, number N is used in the home country, a local mobile phone number N1 is used in the contracted roaming country A, and the number N in the home country is still used in the non-contracted roaming country B.

When the present invention is implemented in a network shown in FIG. 2 according to FIG. 11, the home country obtains the mobile phone numbers in the contracted roaming country first; when a mobile phone is roaming, in step A1, the mobile phone registers its location in the VLR in the roaming region through BTS, BSC and MSC because of change of mobile phone location; the VLR initiates a location update request to the HLR in the subscriber's home region. The HLR informs RNM of the subscriber location update and requests to allocate a mobile phone number in the roaming country to the mobile phone. In step A3, the RNM in the home country determines whether the roaming country is a contracted roaming country; if the subscriber is in a contracted roaming country, in step A4, the RNM allocates a number from the available numbers in the contracted roaming country and feeds it back to HLR, and stores the mapping between the subscriber and the number (a plurality of numbers may corresponds to the subscriber: the number in the home country, a temporary local number in the roaming region or bound numbers in other contracted countries); if the subscriber is not in a contracted roaming country, in step A5, the RNM feeds the number in the home country back to HLR. The number fed back by RNM to HLR is called the current default number of the subscriber. In step A6, the HLR takes the number fed back by the RNM in the home country as the current default number of the subscriber and inserts it along with other data in the VLR in the region where the subscriber stays currently, deletes the subscriber's record in the old VLR, and updates mobile phone location information in the subscriber record; if the subscriber's current default number changes, the HLR will inform the subscriber of the new current default number fed back from the RNM in the subscriber's home region. In FIG. 2, when the subscriber roams from the home country to the contracted roaming country A, the RNM in the home country allocates a local mobile phone number N1 to the subscriber; the HLR in the home country inserts number N1 and other subscriber data in the VLR in country A where the subscriber stays currently, deletes the subscriber record in the VLR in the home country; when the subscriber roams into a non-contracted roaming country B, the RNM instructs the subscriber's current default number is the number N in the home country; the HLR in the home country inserts the number N and other subscriber data (e.g., contracted data) into the VLR in country B where the subscriber stays currently.

On the basis of above steps, in step A7, when the subscriber receives an incoming call or initiates an outgoing call, the RNM will process the call. That is to say, if the mobile phone of the roaming subscriber is the caller, it uses the temporary roaming number allocated by RNM (i.e., the current default mobile phone number) to initiate the call; if it is the called, the caller may dial its local mobile phone number in the roaming country or its mobile phone number in the home country, and the MSC in the roaming country (if the caller dials the number in the roaming country) queries RNM or the MSC in the home country (if the caller dials the number in the home country) queries HLR about the calling route to the called subscriber. In the former case, the RNM maps the subscriber's number in roaming region to its number in home country, and then queries about HLR for the calling route. The HLR finds the corresponding subscriber record and obtains subscriber location information (i.e., VLR number in the current roaming country), and thus obtains the route information through accessing the VLR in the roaming country, and then instructs the MSC to establish the call. In the RNM in home country, if any of the numbers maps to a subscriber, the mapping is unique; however, a subscriber may have been mapped to several numbers in different countries; no matter which number is dialed by the caller, a unique subscriber record can be found, and thus the subscriber location information is obtained. In FIG. 2, when the subscriber roams into country A, the calling subscriber who calls the roaming subscriber may dial number N or N1.

In implementation of the embodiment shown in FIG. 11, only when the country after subscriber location change changes, the action of allocating a mobile phone number in the roaming country will be triggered. As long as the subscriber stays in the country, above number will be used, until the subscriber leaves the country. After above phone number allocation process is finished, the network will inform the roaming subscriber of the temporary local number in the current roaming country by means of short message, voice or Unstructured Supplementary Service Data (USSD) or other ways, depending on the capability of the network and the operator's choice.

When the mobile phone subscriber leaves the contracted roaming country and enters into another country, the HLR in the home country will inform the RNM of the subscriber location update, the RNM will release the local mobile phone number occupied by the subscriber and break the mapping between the number and the subscriber. The time span from the number is allocated to the time it is released is called the life time of the number. For example, as shown in FIG. 2, when the roaming subscriber leaves country A, the RNM will releases number N1.

In addition, in implementation of the embodiment shown in FIG. 12, to avoid possible conflict between phone numbers during dynamic allocation, certain anti-conflict policies may be used to reuse released numbers. A simple but practicable policy is: the released number is locked temporarily within a certain time period, which is proportional to the life time of the number; after the time period, the number may be reallocated to a roaming subscriber.

If a mobile phone subscriber frequently travels between the home country and a contracted roaming country and requires to possess a number in the contracted roaming country, a number may be allocated to the subscriber from the available numbers in the contracted roaming country as a fixed number, which will not be allocated to any other roaming subscriber; even though the subscriber leaves the contracted roaming country, the mapping between the number and the subscriber is still maintained. Above operation is called number binding. When the subscriber roams into above contracted roaming country, the HLR in the home country is triggered by a location update request to request the RNM to allocate a local mobile phone number to the subscriber; the RNM will return the bound number to HLR, so that the subscriber is enabled to use the bound number to process calls. When the subscriber doesn't need the bound number any more, the binding may be broken, and the number will be released and reused. Certainly, usually a plurality of numbers in the contracted roaming countries may be bound to a subscriber.

When the caller dials a bound number of the called subscriber, the RNM finds the subscriber corresponding to that number, and queries HLR to obtain the subscriber location information (VLR number or MSC number), to accomplish route query. Therefore, if the called subscriber has bound numbers, the caller will have more choices: the called subscriber's number in the home country, bound numbers, or the temporary number in the current contracted roaming country.

Taking two roaming countries as an example, the embodiment in FIG. 11 is described; actually, localized roaming service can be provided in a plurality of roaming countries, and the number of roaming countries is only limited by the number of contracted countries contracted by operators as well as storage capacity of and processing ability of the RNMs.

It should be noted that the network and method for implementing localized roaming of mobile subscribers provided by the present invention are universal; for example, the present invention can be applied in domestic roaming regions as well as different cellular mobile communication systems including, but not limited to such systems as AMPS (Advanced Mobile Phone Service), GSM (Global System for Mobile Communications), D-AMPS (Digital-Advanced Mobile Phone Service), CDMA (Code Division Multiple Access), IMT-2000 (a generic term of third generation mobile communication systems defined by International Telecommunication Union). If the mobile terminals support diverse air interfaces (such as multi-mode terminals), the network and method can also be used to provide roaming service among different systems.

The invention claimed is:

1. A network for implementing localized roaming of mobile subscribers, comprising:
    a Visiting Location Register (VLR) in a contracted roaming network, a Home Location Register (HLR) in a home network, and at least one Roaming Number Manager (RNM) connected with the HLR in the home network;

wherein the HLR in the home network is adapted to inform an RNM corresponding to the current location of a subscriber roaming in the contracted roaming network of subscriber location update upon receiving a request from the VLR in the contracted roaming network;

the RNM is adapted to allocate a local mobile phone number from a pool of local mobile phone numbers in the contracted roaming network for the phone, store mapping between the allocated local mobile phone number and the phone, and return the allocated local mobile phone number to the HLR in the home network, wherein the allocated local mobile phone number for the phone is adapted to be utilized as a calling number to make a call or as a called number to answer a call in the contracted roaming network and released when the subscriber leaves the contracted roaming network; and the HLR in the home network is further adapted to send the local mobile phone number in the contracted roaming network to the VLR in the contracted roaming network to be inserted in the VLR.

2. The network for implementing localized roaming of mobile subscribers according to claim 1, wherein said RNM is embedded in said HLR.

3. A method for implementing localized roaming of mobile subscribers based on the network of claim 1, comprising:
   a) configuring the RNM with local mobile phone numbers in the contracted roaming network, an independent Public Switched Telephone Network/Integrated Service Digital Network (PSTN/ISDN) number and a signaling point code;
   b) configuring data in entities of the contracted roaming network and entities of the home network, so that the subscriber location query message taking a local number in the roaming network as the destination address will be directed to the RNM in the home network;
   c) establishing interfaces between the RNM and entities of the contracted roaming network as well as between the RNM and entities of the home network;
   d) developing communication services in the roaming network based on the configuration in respective entities of the contracted roaming network and the home network, implementing localized roaming of the subscriber;
   wherein, the RNM is adapted to allocate a local mobile phone number from a pool of local mobile phone numbers in the contracted roaming network for the phone, wherein the allocated local mobile phone number for the phone is adapted to be utilized as a calling number to make a call or as a called number to answer a call in the contracted roaming network, and released when the subscriber leaves the contracted roaming network.

4. The method for implementing localized roaming of mobile subscribers according to claim 3, wherein said step c comprises:
   c1) establishing an interface between the RNM and an MSC in the roaming network;
   c2) establishing an interface between the RNM and the HLR in the home network.

5. The method for implementing localized roaming of mobile subscribers according to claim 3, wherein said step d comprises a subscriber location update process:
   sending a location update request from the VLR currently serving the subscriber to the HLR in the home network;
   d2) according to the location update request received from the VLR and the current location of the subscriber, addressing the RNM corresponding to the current location of the subscriber through the PSTN/ISDN number of RNM and informing the RNM of the subscriber location update, by the HLR in the home network;
   d3) allocating by the RNM a local mobile phone number in the roaming network, to the phone, and returning said number to the HLR in the home network;
   d4) inserting said local mobile phone number in the roaming network into the VLR currently serving the subscriber, and returning an acknowledgement message of obtaining said number in the roaming network to the RNM, by the HLR in the home network.

6. The method for implementing localized roaming of mobile subscribers according to claim 5, wherein step d3, before allocating a local mobile phone number to the phone, further comprises:
   determining by the RNM whether the roaming region where the subscriber is roaming is a contracted roaming region;
   if so, allocating one from the available numbers in the contracted roaming network and feeding the allocated number back to HLR in the home network by the RNM;
   otherwise feeding the mobile phone number of the subscriber in the home network to HLR in the home network.

7. The method for implementing localized roaming of mobile subscribers according to claim 6, wherein:
   an incoming call or an outgoing call is processed by using the number fed back from RNM in the home network.

8. The method for implementing localized roaming of mobile subscribers according to claim 7, wherein the call is processed by using the number fed back from RNM in the home network in the following manner:
   when acting as the caller, the subscriber uses the number fed back from the RNM in the home network to initiate a call;
   when the subscriber acts as the called party, if the called number is the mobile phone number in home network, the MSC in the home network queries HLR in the home network to determine the calling route, the HLR finds the corresponding subscriber record, obtains address of VLR currently serving the subscriber, and accesses said VLR to obtain the calling route, with which the HLR instructs the MSC in the home network to establish a calling route;
   if the called number is a local mobile phone number in a roaming region, the MSC in the roaming network queries RNM about calling route information, the RNM finds the subscriber identifier, queries the HLR about the calling route information in accordance with the subscriber identifier, and forwards the calling route information returned from HLR to the MSC in the roaming network.

9. The method for implementing localized roaming of mobile subscribers according to claim 5, further comprising:
   informing the subscriber of the location update by voice, short message or Unstructured Supplementary Service Data.

10. The method for implementing localized roaming of mobile subscribers according to claim 5, further comprising:
    when the subscriber leaves the contracted roaming network, the HLR in the home network informs the RNM of the subscriber location update, the RNM releases the local mobile phone number, occupied by the subscriber, in the roaming network, and breaks the mapping between the number and the subscriber.

11. The method for implementing localized roaming of mobile subscribers according to claim 10, further comprising:
   binding the local mobile phone number in the contracted roaming network to a the subscriber.

12. The method for implementing localized roaming of mobile subscribers according to claim 5, wherein said VLR in step addresses the HLR in the home network in accordance with International Mobile Subscriber Identifier (IMSI) of the subscriber.

13. The method for implementing localized roaming of mobile subscribers according to claim 5, wherein the information carried in the location update request sent from VLR to HLR in step and the parameters carried in the location update informed from HLR to RNM in step d2 comprise:
   the IMSI of the subscriber and/or the mobile phone number in the home network, current location of the subscriber and old location of the subscriber.

14. The method for implementing localized roaming of mobile subscribers according to claim 5, wherein the subscriber location update process further comprises:
   d5) informing the RNM serving the old location of the subscriber by the HLR in the home region;
   d6) if there is no binding relation between the subscriber and the local mobile phone number occupied by the subscriber, releasing said local mobile phone number occupied by the subscriber by the RNM; and
   d7) sending a response from the RNM to the HLR in the home network.

15. The method for implementing localized roaming of mobile subscribers according to claim 5, wherein the subscriber location update process further comprises:
   sending an acknowledgement for number allocation from the HLR to the RNM serving the current location of the subscriber, after receiving an acknowledgement for subscriber data insertion from the VLR.

16. The method for implementing localized roaming of mobile subscribers according to claim 5, wherein the subscriber location update process further comprises:
   if not receiving the acknowledgement for number allocation from the HLR for a determined period, the RNM releasing the allocated number.

17. The method for implementing localized roaming of mobile subscribers according to claim 3, wherein said step d comprises a process for calling the subscriber with the local mobile phone number in the roaming region; said process comprising:
   d8) when the call is made to the subscriber with the local mobile phone number in the roaming network, initiating a route query from a GMSC in the roaming network to the RNM currently serving the subscriber;
   d9) after receiving the query, the RNM searching for the subscriber identifier according to the local mobile phone number in the roaming network, and querying HLR in home network about the calling route in accordance with the subscriber identifier;
   d10) returning the query result from the HLR in the home network to the RNM, which sends an acknowledgement for route query to the GMSC and instructs the GMSC to establish the route with the number obtained from the HLR.

18. The method for implementing localized roaming of mobile subscribers according to claim 3, wherein said step d also comprises a process for calling the subscriber with the mobile phone number in the home network; said process comprising:
   d11) when the call is made to the subscriber by using the mobile phone number in the home network, initiating a route query from a GMSC in the home network to the HLR in the home network;
   d12) after receiving the query, requesting the VLR currently serving the subscriber to allocate a temporary routing number according to the mobile phone number of the subscriber in the home network by the HLR in the home network;
   d13) allocating, by the VLR currently serving the subscriber, a temporary routing number to the subscriber, and returning said temporary routing number to the HLR in the home network;
   d14) sending an acknowledgement for route query from the HLR in the home network to the GMSC in the home network, and instructing the GMSC to establish a route with the allocated temporary routing number.

19. The method for implementing localized roaming of mobile subscribers according to claim 3, wherein said step d further comprises a process of sending a short message to the subscriber with the local mobile phone number in the roaming network; said process comprising:
   d15) sending a short message from a Short Message Service Center (SC) to a Short Message Service Gateway Mobile Switching Center SMS (GMSC), which initiates a route query to the RNM;
   d16) on receiving the query searching for the subscriber identifier according to the local mobile phone number in the roaming network, and querying the HLR in the home network about the route with the subscriber identifier, by the RNM;
   d17) returning the MSC number or a Service GPRS Supporting Node (SGSN) number currently serving the subscriber from the HLR in the home network to the RNM;
   d18) sending an acknowledgement for route query from the RNM to the SMS GMSC, to instruct the route for the short message with the MSC number or the SGSN number obtained from the HLR in the home network, and issuing the short message by the SMS GMSC.

* * * * *